United States Patent [19]

Hohner

[11] Patent Number: 5,998,547
[45] Date of Patent: Dec. 7, 1999

[54] POLYPROPYLENE WAXES MODIFIED SO AS TO BE POLAR

[75] Inventor: Gerd Hohner, Gersthofen, Germany

[73] Assignee: Clariant GmbH, Frankfurt, Germany

[21] Appl. No.: 08/977,088

[22] Filed: Nov. 24, 1997

[30] Foreign Application Priority Data

Nov. 26, 1996 [DE] Germany .............................. 196 48 895

[51] Int. Cl.$^6$ .................................................. C08F 265/02
[52] U.S. Cl. ......................... 525/301; 525/263; 525/386; 525/387
[58] Field of Search ...................... 525/263, 301, 525/333.8, 386, 387

[56] References Cited

U.S. PATENT DOCUMENTS

| | | |
|---|---|---|
| 3,480,580 | 11/1969 | Joyner . |
| 3,481,910 | 12/1969 | Brunson . |
| 4,041,056 | 8/1977 | Heintzelman . |
| 4,159,287 | 6/1979 | Ames ....................................... 428/511 |
| 5,290,954 | 3/1994 | Roberts . |
| 5,384,375 | 1/1995 | Roberts ................................ 525/327.6 |
| 5,451,639 | 9/1995 | Marczinke et al. ...................... 525/193 |

FOREIGN PATENT DOCUMENTS

| | | |
|---|---|---|
| 0024034 A1 | 2/1981 | European Pat. Off. . |
| 0251771 A1 | 1/1988 | European Pat. Off. . |
| 0 321 852 A1 | 6/1989 | European Pat. Off. . |
| 0 416 566 A2 | 3/1991 | European Pat. Off. . |
| 0 384 264 B1 | 3/1993 | European Pat. Off. . |
| 0 480 190 B1 | 6/1995 | European Pat. Off. . |
| 1429618 | 3/1965 | France . |
| 2329641 | 12/1974 | Germany . |
| 3148229 A1 | 6/1983 | Germany . |
| 4308587 | 9/1994 | Germany . |
| 19500426 | 3/1996 | Germany . |
| WO 8901951 | 3/1989 | WIPO . |
| WO 9324539 | 12/1993 | WIPO . |
| WO 9404577 | 3/1994 | WIPO . |
| WO 9606120 | 2/1996 | WIPO . |

OTHER PUBLICATIONS

Chem. Abstract vol. 65 (1966) Improvements in coating polyolefin objects.
International Search Report for PCT/EP/9706415 (1997).
Derwent Patent Family Report (1997).

*Primary Examiner*—Robert Dawson
*Assistant Examiner*—D. Aylward
*Attorney, Agent, or Firm*—Miles B. Dearth

[57] ABSTRACT

The present invention relates to partially crystalline polypropylene homopolymer or copolymer waxes modified so as to be polar and having an acid or saponification number of from 0.5 to 120 mg KOH/g, a melt viscosity of from 20 to 50,000 mPa.s/170° C. and a softening point (ring/ball) of from 90 to 165° C., prepared by reacting a nonpolar polypropylene homopolymer or copolymer wax with an α,β-unsaturated carboxylic acid or a derivative thereof in the presence of free-radical formers, wherein the nonpolar polypropylene wax has been prepared by direct polymerization of propylene or copolymerization of propylene with higher 1-olefins using catalysts of Ziegler or metallocene type and has a softening point (ring/ball) of from 90 to 165° C.

The waxes are useful as plastics additives, for aqueous dispersions or for melt adhesive formulations.

16 Claims, No Drawings

POLYPROPYLENE WAXES MODIFIED SO AS TO BE POLAR

The invention relates to polypropylene waxes modified so as to be polar and based on nonpolar polypropylene wax precursors, where the latter are prepared in a polymerization process using catalysts of the Ziegler or metallocene type.

Polyolefin waxes modified so as to be polar have many uses, for example for the preparation of aqueous dispersions for care and cleaning products (e.g. for floors, automobiles, shoes, etc.) and the industrial sector, as additives in the processing of plastics or as formulation components in hot melt compositions. Polyethylene waxes are generally modified by oxidation with air. In the case of polymer waxes based on higher polyolefins, for example propylene, this process cannot be employed since the air oxidation of such waxes leads to soft, discolored products which are not usable for most applications. In the case of such waxes, the polar modification required for the applications mentioned can instead be achieved by free-radical reaction with polar compounds containing olefinic double bonds.

U.S. Pat. No. 3,481,910 discloses polar, wax-like polyolefins which are obtained by reaction of polyolefin hydrocarbons with unsaturated polycarboxylic acids or their derivatives in a stirred apparatus. The polyolefin waxes used for the modification are prepared by thermal degradation of high molecular weight polyolefin plastics. The reaction temperatures in the modification are from 200 to 400° C., in the examples not less than 325° C. The first disadvantage is the high outlay required for preparing the wax raw material obtained in two stages by polymerization and subsequent degradation. Further disadvantages are the high temperature necessary for the actual modification reaction and the associated danger of thermal damage to the reaction products.

U.S. Pat. No. 3,480,580 and U.S. Pat. No. 5,290,954 describe further processes for the polar modification of polyolefin waxes from the thermal degradation of polyolefin plastics. The reaction with the polar component takes place in the presence of a free-radical former at temperatures of from 150 to 300° C. or below 190° C. The modification reaction is associated with a rise in the melt viscosity which indicates the simultaneous occurrence of crosslinking processes. As can be seen from the examples in U.S. Pat. No. 5,290,954, the reproducibility of the products in respect of their melt viscosity and their homogeneity is unsatisfactory. An uncontrollably rising viscosity or crosslinking of the reaction mixture also entails the risk of blockage of the agitator.

U.S. Pat. No. 4,041,056 describes products which are prepared by reacting paraffin and polyethylene waxes with maleic anhydride and related compounds. Although the possibility of correspondingly modifying polypropylene waxes whose origin is not further specified is described in the text, no further details are given and it is not the actual subject matter of the patent application.

It is thus an object of the invention to provide a polar polypropylene wax which can be prepared simply, economically and reproducibly while avoiding the abovementioned disadvantages.

It has been found that polypropylene waxes which have been prepared in an economical manner in a direct polymerization by means of catalysts of the Ziegler or metallocene type can be reacted with suitable monomers in the presence of added peroxides at comparatively low temperatures with good reproducibility and homogeneity without danger of a viscosity increase and without a risk of thermal damage to polar waxes.

The invention accordingly provides a partially crystalline polypropylene homopolymer or copolymer wax modified so as to be polar and having an acid or saponification number of from 0.5 to 120 mg KOH/g, a melt viscosity of from 20 to 50,000 mPa.s/170° C. and a softening point (ring/ball) of from 90 to 165° C., prepared by reacting a nonpolar polypropylene homopolymer or copolymer wax with an $\alpha,\beta$-unsaturated carboxylic acid or a derivative thereof in the presence of free-radical formers, wherein the nonpolar polypropylene wax has been prepared by direct polymerization of propylene or copolymerization of propylene with higher 1-olefins using catalysts of the Ziegler or metallocene type and has a softening point (ring/ball) of from 90 to 165° C.

The synthesis of the unmodified, i.e. nonpolar, starting waxes by means of catalysts of the Ziegler or metallocene type is known from numerous documents. Thus, for example, DE-A-2329641 discloses a process by means of which $\alpha$-olefins can be polymerized in a direct polymerization reaction using Ziegler catalysts to give homopolymer or copolymer waxes. DE-A-3148229 describes the preparation of highly crystalline polypropylene waxes by polymerization likewise using titanium-containing catalysts; the same in EP-A480190. In addition, propylene homopolymer and copolymer waxes are also obtainable using metallocene catalysts (e.g. EP-A-321 852, EP-A-384 264, EP-A416 566).

Suitable starting materials are low molecular weight propylene homopolymers prepared using Ziegler or metallocene catalysts and having melt viscosities, measured at 170° C., of from 20 to 50,000 mPa.s. The softening points (ring/ball) of such waxes are generally from 90 to 165° C., preferably from 90 to 145° C. Suitable waxes are both highly crystalline products having a high proportion of isotactic or syndiotactic structures and those having a low crystallinity and a predominantly atactic structure. The degree of crystallinity of propylene homopolymers can be varied within wide limits in a known manner by appropriate selection of the catalyst used for the polymerization and by means of the polymerization conditions. This applies particularly when using metallocene catalyst systems.

Further suitable starting materials are propylene copolymer waxes which are prepared using Ziegler or metallocene catalysts and comprise not only propylene but also varying amounts of other olefins, for example ethylene or higher $\alpha$-olefins having a chain length range of $C_4$–$C_{30}$, where the comonomer units can be distributed either predominantly randomly or predominantly in blocks between isotactic, syndiotactic or partially atactic polypropylene sequences. Such waxes have softening points (ring/ball) of generally from about 90 to 165° C., preferably from 90 to 145° C.

Suitable polar components are $\alpha,\beta$-unsaturated carboxylic acids or their derivatives. Examples which may be mentioned are acrylic acid or methacrylic acid or their esters or amides, maleic acid, maleic anhydride, monoesters of maleic acid, e.g. monoalkyl maleates, diesters of maleic acid, e.g. dialkyl maleates, or amides of maleic acid, e.g. maleimide or N-alkyl-substituted maleimides. It is also possible to use mixtures of these compounds. Preference is given to maleic acid and its derivatives; particular preference is given to maleic anhydride. The polar component is used in an amount, based on prolpropylene wax, of 0.1–20% by weight.

Suitable free-radical formers are compounds which disintegrate into free radicals to a sufficient extent under the reaction conditions. Particularly suitable free-radical formers are organic peroxides, for example alkyl, aryl or aralkyl peroxides such as di-tert-butyl peroxide or dicumyl peroxide, peroxyesters such as tert-butyl peracetate or tert-butyl perbenzoate or hydroperoxides such as tert-butyl hydroperoxide or cumene hydroperoxide. Further possible free-radical formers are aliphatic azo compounds such as azobis(2-methylpropionitrile) or 2,2'-azobis-(2,4-dimethylvaleronitrile). Preference is given to dialkyl peroxides, particularly preferably di-tert-butyl peroxide. The free-radical former is used in a concentration, based on polypropylene wax used, of 0.1–5% by weight.

The reaction of the polypropylene wax with the polar component can be carried out either continuously or batchwise. In the batchwise procedure, the wax is heated to a temperature above its softening point and both the polar component and the peroxide are introduced into the melt while stirring, either continuously over an appropriate period of time or in one or more portions, if desired under a blanket of inert gas. The reaction temperature is above the softening point of the wax, preferably from 100 to 200° C., particularly preferably from 130 to 180° C. After metering-in is complete, the mixture can be left to react further at the same temperature or a different temperature, if desired after addition of a further amount of peroxide. Volatile components formed during the reaction or excess volatile starting components can, for example, be distilled off under reduced pressure or be removed by stripping with inert gas.

The polar waxes of the present invention have an acid or saponification number of from 0.5 to 120 mg KOH/g, a melt viscosity of 20–50,000 mPa.s and a softening point (ring/ball) of 90–165° C., preferably 90–145° C. They are pale in color and homogeneous, their melt viscosity is lower than that of the wax raw material used, at most approximately similar, and they are free of high molecular weight or crosslinked material.

Such polypropylene waxes modified so as to be polar have many possible applications. They may be used in melt adhesive formulations, as dispersants for inorganic and organic colorants in pigment masterbatch preparations for coloring plastics, as release agents in phototoner mixtures or as additives in plastics processing. If the polarity is sufficiently high, the waxes can be processed in the presence of customary auxiliaries to give finely divided, stable aqueous dispersions. Such dispersions are suitable as formulation components in, for example, floor, automobile, furniture and shoe care products and also for use in industrial emulsions, for instance for textile processing.

EXAMPLES

The melt viscosity of the wax products described below was measured by means of a rotation viscometer. The acid and saponification numbers were determined in accordance with the method M-IV 2 (75) from "DGF Standard Methods—Section M—Waxes", the softening points (ring/ball) in accordance with the method M-III 13 (75) from the same collection of methods. Heats of fusion were determined by the DSC method.

Examples 1–11

Modification Using Maleic Anhydride 500 g of a polypropylene wax prepared as described in DE-A-2329641 and having a melt viscosity of 1950 mPa.s, measured at 170° C., a softening point of 159° C. and a heat of fusion of 83 J/g were melted under a blanket of nitrogen in a glass apparatus fitted with stirrer, internal thermometer and distillation attachment. At a temperature of 165° C., 35.0 g of liquid maleic anhydride heated to about 60° C. were added from a dropping funnel over a period of 3 hours; at the same time, 10.0 g of di-tert-butyl peroxide were added continuously from a second dropping funnel. After metering-in was complete, a further 1.1 g of di-tert-butyl peroxide was added to the reaction mixture, the reaction temperature was increased to 170° C. and the mixture was allowed to react further for 2 hours. A reduced pressure of about 30 mbar was then applied and the volatile constituents were distilled off. After about 30 minutes, the pressure was restored to atmospheric pressure by introduction of nitrogen. To remove remaining volatile constituents, nitrogen was passed through the wax melt for a further 15 minutes and the melt was then poured out. This gave a pale yellow wax having the properties shown in Table 1 under Example 1.

Examples 2 and 3 are repetitions of Example 1 to check the reproducibility.

Comparative Example 1

Modification using maleic anhydride of a wax prepared from polypropylene plastic by thermal degradation.

A wax obtained from homopolymeric polypropylene plastic having an $MFI_{230/2.16}$ of 22 g/10 min and a crystallite melting point of 165° C. by thermal degradation at 350° C. and having a melt viscosity of 1850 mPa.s/170° C. and a softening point (ring/ball) of 162° C. was reacted with maleic anhydride as described in Example 1. The viscosity of the reaction mixture rose continually; about 4 hours after commencement of metering-in of maleic anhydride and di-tert-butyl peroxide, the mixture was completely crosslinked so that the reaction had to be stopped.

Comparative Examples 2 and 3

Maleic anhydride-modification of Epolene® N-15 (polypropylene degradation wax from Eastman Chem. Corp. having a melt viscosity of about 600 mPa.s at 190° C. and a softening point of 163° C.):

The reaction with maleic anhydride was carried out by a method similar to Example 1. The modified wax obtained has an acid number of 40 mg KOH/g and a melt viscosity of 4030 mPa.s/170° C. A second experiment carried out using the same raw material and under the same conditions gave a modified wax having an acid number of 41 mg KOH/g and a melt viscosity of 8680 mPa.s/170° C.

Comparative Example 4

Modification of a polypropylene degradation wax using maleic anhydride.

A degradation wax having a viscosity of 350 mPa.s at 1700° C. and a softening point of 152° C. was prepared from a copolymeric PP plastic having an $MFI_{230/2.16}$ of 7 g/10 min and a crystallite melting point of 144° C. by heat treatment at 450° C. under a blanket of nitrogen. The degradation wax was reacted with maleic anhydride in the same way as in Example 1. The reaction had to be stopped after 2 hours because the contents of the flask were crosslinked and could no longer be stirred.

Example 12

Modification using acrylic acid.

500 g of the Ziegler homopolymer wax used in Examples 1–5 was melted under a blanket of nitrogen in a glass apparatus fitted with stirrer, internal thermometer and distillation attachment. At a temperature of 160° C., a mixture of 50.0 g of acrylic acid and 10.0 g of di-tert-butyl peroxide was added continuously from a dropping funnel over a period of 4 hours. After metering-in was complete, the mixture was allowed to react further for 1 hour. A vacuum was subsequently applied and the volatile constituents were distilled off. After about 30 minutes, the pressure was restored to atmospheric pressure by introduction of nitrogen. The pale yellow wax obtained had an acid number of 52 mg KOH/g, a melt viscosity of 580 mPa.s and a softening point of 146° C.

TABLE 1

Examples 1–11

| | | PP wax used | | | | Amount of maleic anhydride used | Product | | |
|---|---|---|---|---|---|---|---|---|---|
| Example | Type | Prepared in accordance with | Viscosity/ 170° C. | Softening point (R/B) | Heat of fusion | (based on PP wax used) | Viscosity/ 170° C. | Softening point (R/B) | Acid number |
| 1 | Homopolymer | DE 2329641 (Ziegler cat.) | 1950 | 159 | 83 | 7 | 980 | 151 | 38 |
| 2 | Homopolymer | DE 2329641 (Ziegler cat.) | 1950 | 159 | 83 | 7 | 1050 | 149 | 39 |
| 3 | Homopolymer | DE 2329641 (Ziegler cat.) | 1950 | 159 | 83 | 7 | 910 | 150 | 40 |
| 4 | Homopolymer | DE 2329641 (Ziegler cat.) | 1950 | 159 | 83 | 1 | 930 | 150 | 38 |
| 5 | Homopolymer | DE 2329641 (Ziegler cat.) | 1950 | 159 | 83 | 10 | 1000 | 152 | 59 |
| 6 | Homopolymer | DE-A 3148229 (Ziegler cat.) | 720 | 161 | 86 | 7 | 380 | 149 | 40 |
| 7 | Homopolymer | EP 571882 (Metallocene) | 2390 | 153 | 93 | 7 | 630 | 147 | 39 |
| 8 | Homopolymer | EP 571882 (Metallocene) | 1500 | 131 | 61 | 7 | 1370 | 126 | 40 |
| 9 | Propylene-ethylene copolymer | EP 571882 (Metallocene) | 2110 | 143 | 93 | 7 | 980 | 136 | 38 |
| 10 | Propylene-ethylene copolymer | EP 571882 (Metallocene) | 2000 | 112 | 48 | 7 | 1360 | 108 | 41 |
| 11 | Propylene-ethylene copolymer | EP 571882 (Metallocene) | 1050 | 100 | 38 | 7 | 890 | 95 | 41 |
| | | | mPa · s | ° C. | J/g | % by weight | mPa · s | ° C. | mg KOH/g |

I claim:

1. A partially crystalline polypropylene homopolymer or copolymer wax modified so as to be polar and having an acid or saponification number of from 0.5 to 120 mg KOH/g, a melt viscosity of from 20 to 50,000 mPa.s/170° C. and a softening point (ring/ball) of from 90 to 165° C., prepared by reacting a nonpolar polypropylene homopolymer or copolymer wax with an α,β-unsaturated carboxylic acid or a derivative thereof in the presence of free-radical formers, wherein the nonpolar polypropylene wax has been prepared by direct polymerization of propylene or copolymerization of propylene with higher 1-olefins using catalysts of the Ziegler or metallocene type and has a softening point (ring/ball) of from 90 to 165° C.

2. A partially crystalline polypropylene homopolymer wax modified so as to be polar and having an acid or saponification number of from 0.5 to 120 mg KOH/g, a melt viscosity of from 20 to 50,000 mPa.s/170° C. and a softening point (ring/ball) of from 90 to 165° C., prepared by reacting a nonpolar polypropylene homopolymer wax with an α,β-unsaturated carboxylic acid or a derivative thereof in the presence of free-radical formers, wherein the nonpolar polypropylene wax has been prepared by direct polymerization of propylene using catalysts of the Ziegler or metallocene type and has a softening point (ring/ball) of from 90 to 165° C.

3. A partially crystalline polypropylene homopolymer or copolymer wax modified so as to be polar and having an acid or saponification number of from 0.5 to 120 mg KOH/g, a melt viscosity of from 20 to 50,000 mPa.s/170° C. and a softening point (ring/ball) of from 90 to 145° C., prepared by reacting a nonpolar polypropylene homopolymer or copolymer wax with an α,β-unsaturated carboxylic acid or a derivative thereof in the presence of free-radical formers, wherein the nonpolar polypropylene wax has been prepared by direct polymerization of propylene or copolymerization of propylene with higher 1-olefins using catalysts of the Ziegler or metallocene type and has a softening point (ring/ball) of from 90 to 145° C.

4. A partially crystalline polypropylene homopolymer wax modified so as to be polar and having an acid or saponification number of from 0.5 to 120 mg KOH/g, a melt viscosity of from 20 to 50,000 mPa.s/170° C. and a softening point (ring/ball) of from 90 to 145° C., prepared by reacting a nonpolar polypropylene homopolymer wax with an α,β-unsaturated carboxylic acid or a derivative thereof in the presence of free-radical formers, wherein the nonpolar polypropylene wax has been prepared by direct polymerization of propylene using catalysts of the Ziegler or metallocene type and has a softening point (ring/ball) of from 90 to 145° C.

5. A process for the use of the waxes as claimed in claim 1 comprising: incorporating said wax into articles selected from the group consisting of a dispersion, a hot melt adhesive, and a plastic article.

6. A process for the use of the waxes as claimed in claim 2 comprising: incorporating said wax into articles selected from the group consisting of a dispersion, a hot melt adhesive, and a plastic article.

7. A process for the use of the waxes as claimed in claim 3 comprising: incorporating said wax into articles selected from the group consisting of a dispersion, a hot melt adhesive, and a plastic article.

8. A process for the use of the waxes as claimed in claim 4 comprising: incorporating said wax into articles selected from the group consisting of a dispersion, a hot melt adhesive, and a plastic article.

9. A process for producing a partially crystalline polypropylene homopolymer or copolymer wax modified so as to be polar and having an acid or saponification number of from 0.5 to 120 mg KOH/g, a melt viscosity of from 20 to 50,000 mPa.s/170° C. and a softening point (ring/ball) of from 90 to 165° C. comprising:

preparing a nonpolar polypropylene homopolymer or copolymer wax with a softening point (ring/ball) of from 90 to 165° C. by direct polymerization of propylene or copolymerization of propylene with higher 1-olefins using catalysts of the Ziegler or metallocene type; and reacting the nonpolar polypropylene homopolymer or copolymer wax with an α,β-unsaturated carboxylic acid or a derivative thereof in the presence of free-radical formers to form the partially crystalline polypropylene homopolymer or copolymer wax.

10. A process for producing a partially crystalline polypropylene homopolymer wax modified so as to be polar and having an acid or saponification number of from 0.5 to 120 mg KOH/g, a melt viscosity of from 20 to 50,000 mPa.s/170° C. and a softening point (ring/ball) of from 90 to 165° C. comprising:

preparing a nonpolar polypropylene homopolymer wax with a softening point (ring/ball) of from 90 to 165° C. by direct polymerization of propylene or copolymerization of propylene with higher 1-olefins using catalysts of the Ziegler or metallocene type; and reacting the nonpolar polypropylene homopolymer wax with an α,β-unsaturated carboxylic acid or a derivative thereof in the presence of free-radical formers to form the partially crystalline polypropylene homopolymer wax.

11. A process for producing a partially crystalline polypropylene homopolymer or copolymer wax modified so as to be polar and having an acid or saponification number of from 0.5 to 120 mg KOH/g, a melt viscosity of from 20 to 50,000 mPa.s/170° C. and a softening point (ring/ball) of from 90 to 145° C. comprising:

preparing a nonpolar polypropylene homopolymer or copolymer wax with a softening point (ring/ball) of from 90 to 145° C. by direct polymerization of propylene or copolymerization of propylene with higher 1-olefins using catalysts of the Ziegler or metallocene type; and reacting the nonpolar polypropylene homopolymer or copolymer wax with an α,β-unsaturated carboxylic acid or a derivative thereof in the presence of free-radical formers to form the partially crystalline polypropylene homopolymer or copolymer wax.

12. A process for producing a partially crystalline polypropylene homopolymer wax modified so as to be polar and having an acid or saponification number of from 0.5 to 120 mg KOH/g, a melt viscosity of from 20 to 50,000 mPa.s/170° C. and a softening point (ring/ball) of from 90 to 145° C. comprising:

preparing a nonpolar polypropylene homopolymer wax with a softening point (ring/ball) of from 90 to 145° C. by direct polymerization of propylene or copolymerization of propylene with higher 1-olefins using catalysts of the Ziegler or metallocene type; and reacting the nonpolar polypropylene homopolymer wax with an α,β-unsaturated carboxylic acid or a derivative thereof in the presence of free-radical formers to form the partially crystalline polypropylene homopolymer wax.

13. The process as claimed in claim 9, further comprising incorporating the partially crystalline polypropylene homopolymer or copolymer wax into articles selected from the group consisting of a dispersion, a hot melt adhesive, and a plastic article.

14. The process as claimed in claim 10, further comprising incorporating the partially crystalline polypropylene homopolymer wax into articles selected from the group consisting of a dispersion, a hot melt adhesive, and a plastic article.

15. The process as claimed in claim 11, further comprising incorporating the partially crystalline polypropylene homopolymer or copolymer wax into articles selected from the group consisting of a dispersion, a hot melt adhesive, and a plastic article.

16. The process as claimed in claim 12, further comprising incorporating the partially crystalline polypropylene homopolymer wax into articles selected from the group consisting of a dispersion, a hot melt adhesive, and a plastic article.

\* \* \* \* \*